United States Patent
Wei et al.

(10) Patent No.: US 10,574,571 B2
(45) Date of Patent: Feb. 25, 2020

(54) METHOD FOR TRANSPARENTLY LOGGING AND REPLICATING DISTRIBUTED SERVICES

(71) Applicant: VMware, Inc., Palo Alto, CA (US)

(72) Inventors: Michael Wei, Palo Alto, CA (US); Ke Wang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 35 days.

(21) Appl. No.: 15/789,819

(22) Filed: Oct. 20, 2017

(65) Prior Publication Data
US 2019/0124000 A1   Apr. 25, 2019

(51) Int. Cl.
| | |
|---|---|
| *H04L 12/721* | (2013.01) |
| *H04L 29/06* | (2006.01) |
| *H04L 12/801* | (2013.01) |
| *H04L 12/26* | (2006.01) |
| *H04L 29/08* | (2006.01) |

(52) U.S. Cl.
CPC .......... *H04L 45/70* (2013.01); *H04L 43/028* (2013.01); *H04L 43/04* (2013.01); *H04L 47/34* (2013.01); *H04L 63/306* (2013.01); *H04L 67/327* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,601,134 | B1 * | 12/2013 | Sorenson, III | H04L 67/1097 709/227 |
| 9,568,943 | B1 * | 2/2017 | Carman | G06F 11/1446 |
| 9,729,350 | B1 * | 8/2017 | Cohn | H04L 12/5601 |
| 2003/0128681 | A1 * | 7/2003 | Rauschmayer | H04L 1/1628 370/338 |
| 2004/0076154 | A1 * | 4/2004 | Mizutani | H04L 45/00 370/389 |
| 2005/0180323 | A1 * | 8/2005 | Beightol | H04L 29/06027 370/230 |
| 2007/0206615 | A1 * | 9/2007 | Plamondon | H04L 1/1887 370/401 |
| 2013/0024496 | A1 * | 1/2013 | Krishnan | G06F 9/505 709/203 |
| 2015/0178831 | A1 * | 6/2015 | Bonig | G06Q 40/04 705/37 |
| 2017/0149748 | A1 * | 5/2017 | Lindteigen | H04L 63/0435 |

OTHER PUBLICATIONS https://barefootnetworks.com.
(Continued)

*Primary Examiner* — Ajit Patel
*Assistant Examiner* — Richard Schnell
(74) *Attorney, Agent, or Firm* — Patterson + Sheridan, LLP

(57) ABSTRACT

The disclosure provides an approach for transferring a packet from a source client to a destination application across a network. The approach generally includes writing an identifier to the packet by a switch, transferring the packet to a distributed log, logging a copy of the packet at the distributed log, and analyzing the packet for misplaced requests. The approach further includes, transmitting the packet from the distributed log to the destination, intercepting the packet by a shim layer and comparing the identifier to a counter maintained by the shim layer, and forwarding the packet to the destination application.

17 Claims, 5 Drawing Sheets

(56) References Cited

OTHER PUBLICATIONS

Balakrishnan et al., "Corfu: A distributed shared log." ACM Transactions on Computer Systems (TOCS), 31(4):10, 2013.
Balakrishnan et al., "Tango: Distributed data structures over shared log." Proceedings of the Twenty-Fourth ACM Symposium on Operating Systems Principles, Nemacolin, PA, USA.
Bosshart et al., P4: Programming protocol-independent packet processors. ACM SIGCOMM Computer Communication Review, 44(3):87-95, 2014.
Dang et al., "Paxos made switch-y", ACM SIGCOMM Computer Communication Review, 46(1):18-24, 2016.
Dang et al., "Netpaxos: Consensus at network speed." Proceedings of the 1st ACM SIGCOMM Symposium on Software Defined Networking Research, p. 5. ACM, 2015.
Dolev et al., "Warm backup using snooping." Distributed and Networked Environments, 1994. Proceedings., First International Workshop on Services in, pp. 60-65. IEEE, 1994.
Hunt et al., "Zookeeper: Wait-free coordination for internet-scale systems." USENIX annual technical conference, vol. 8, p. 9. Boston, MA, USA, 2010.
Kreps et al., "Kafka: A distributed messaging system for log processing." Proceedings of the NetDB, pp. 1-7, 2011.
Lakshman et al., "Cassandra: a decentralized structured storage system." ACM SIGOPS Operating Systems Review, 44(2):35-40, 2010.
Leslie Lamport, "The part-time parliament" FAST, 3:15-30, 2004.
Li et al., "Just say no to paxos overhead: Replacing consensus with network ordering." OSDI, pp. 467-483, 2016.
Li et al., "Be fast cheap and in control with switchkv." NSDI, pp. 31-44, 2016.
Sajee Mathew, "Overview of Amazon Web Services", Amazon Whitepapers, 2014.
Pongracz et al., "Removing roadblocks from sdn: Openflow software switch performance on intel dpdk." Software Defined Networks (EWSDN), 2013 Second European Workshop on, pp. 62-67. IEEE, 2013.
Fred B. Schneider, "Implementing fault-tolerant services using the state machine approach: A tutorial." ACM Computing Surveys (CSUR), 22(4):299-319, 1990.
Shahbaz et al., "A programmable, protocol-independent software switch." Proceedings of the 2016 conference on ACM SIGCOMM 2016 Conference, pp. 525-538, ACM, 2016.
Renesse et al., "Chain replication for supporting high throughput and availability." OSDI, vol. 4, pp. 91-104, 2004.
Wei et al., "Dynamically scalable, fault-tolerant coordination on a shared logging service." Technical report, Microsoft Research Technical Report MSR-TR-2013-40, Microsoft Corporation, 2013.
Wei et al., "vcorfu: A cloud-scale object store on a shared log." NSDI, pp. 35-49, 2017.
Zagorodnov et al., "Engineering fault-tolerant tcp/ip servers using ft-tcp." DSN, pp. 393-402, 2003.
Zagorodnov et al., Practical and low-overhead masking of failures of tcp-based servers. ACM Transactions on Computer Systems (TOCS), 27(2):4, 2009.

* cited by examiner

METHOD FOR TRANSPARENTLY LOGGING AND REPLICATING DISTRIBUTED SERVICES

BACKGROUND

A distributed application (or service) is an application with many copies of the application distributed among a plurality of servers. An application could be, for example, a database or a cache used to support client operations. Distribution of copies of an application among servers on a data center provides advantages such as fault toleration, faster service, and scalability. Fault toleration is possible because if one of the applications or servers fails, other copies of the application exist to continue to service clients. Faster service is possible because multiple copies of the application exist, thus allowing clients to connect to a server experiencing a relatively low load at the time of connection. Scalability is possible because additional servers can be added to accommodate an increase in clients.

Distributed applications pose new challenges, as compared to non-distributed applications existing as a single copy. All copies of a distributed application must be synchronized in a consistent manner so that clients accessing different copies of the application at the same time receive identical responses from their respective copies. For example, if a client modifies a database on one server, copies of that database on other servers must be updated before servicing requests, so as not to service requests from an outdated version of the database. One approach is to have a local storage unit on each server where every request to the application is logged, thus tracking modifications to the application. Subsequently, these local log entries would be shared with other servers for synchronization. However, difficulties arise in ascertaining the exact order of writes to various copies of the application on different servers.

Another challenge is rebuilding an application on a server after the application has failed, such as from a power failure or from an attack by a malicious user. A local storage unit on each server tracks modifications to the application, allowing the application to be restored from a base state. However, a storage unit for each server tends to limit scalability because it requires an additional storage unit for every additional server, whether or not storage space is available on other available storage units already connected to servers.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
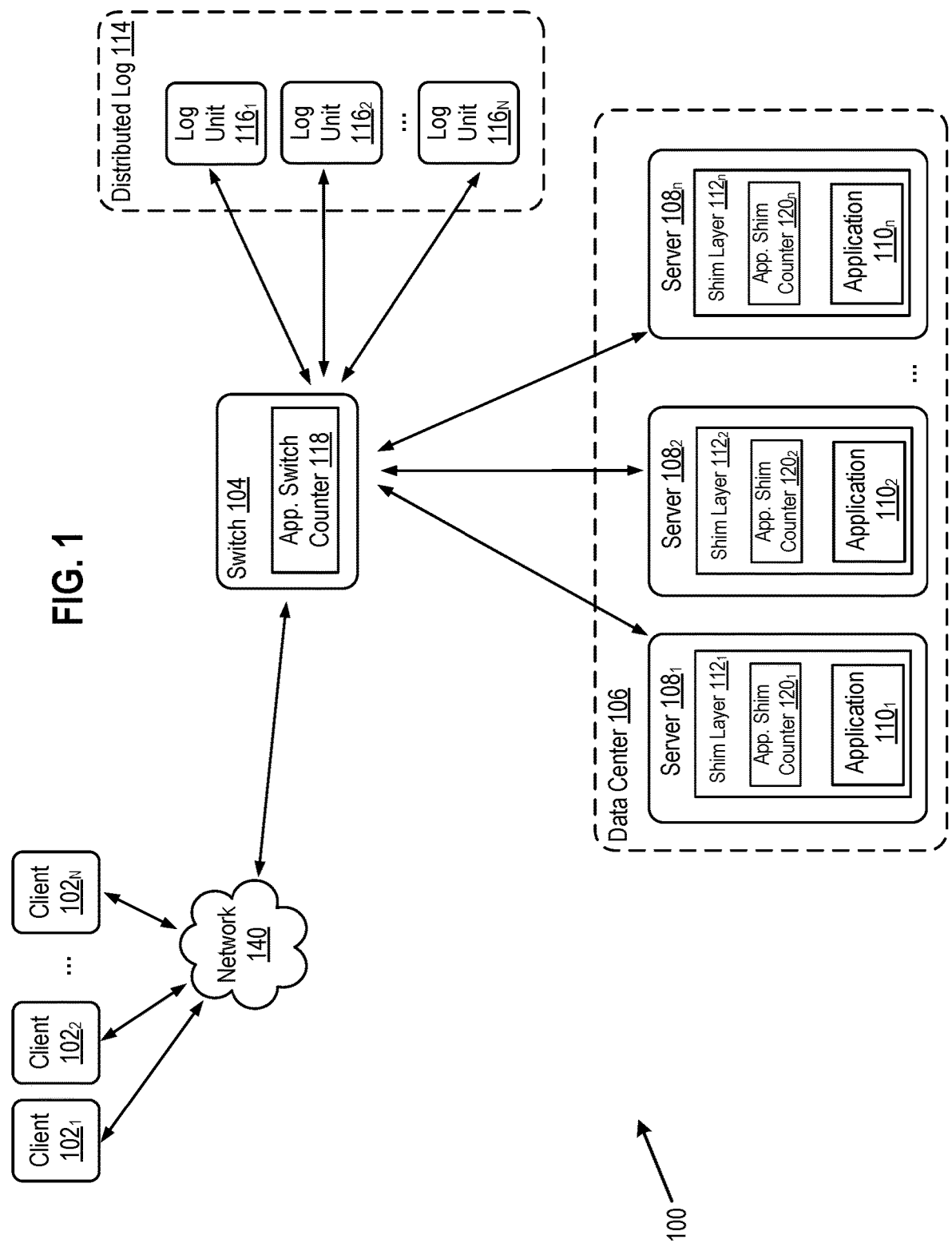
FIG. 1 is a block diagram of a computing system 100 in which one or more embodiments of the present disclosure may be utilized.

FIG. 1 is a block diagram of a computing system 100 in which one or more embodiments of the present disclosure may be utilized. Computing system 100 includes one or more clients $102_1$ to $102_N$ (collectively referred to as clients 102). Each of clients 102 contains a client-side application interface (not shown) that allows interfacing with a server-side application 110, located on server 108 of data center 106. Each of clients 102 is configured to establish a connection, such as a User Datagram Protocol (UDP) or a Transmission Control Protocol (TCP) connection, between itself and application 110 over network 140. A client 102 may be a physical computing device, such as a desktop computer or a mobile device or a virtual machine running on a host computer. The virtual machine may run on top of a software interface layer, such as a hypervisor, that enables sharing of the hardware resources of a host computer. One example of a hypervisor that may be used in an embodiment described herein is a VMware ESXi™ hypervisor provided as part of the VMware vSphere® solution made commercially available from VMware, Inc. of Palo Alto, Calif. The hypervisor may run on top of the operating system of the host or directly on hardware components of the host. A client 102 may also be any other suitable virtual computing instance such as a container (e.g., Docker container), data compute node, isolated user space instance, namespace container, etc.

Computing system 100 includes a network 140, such as a local area network (LAN) or a wide area network (WAN), that connects clients 102 to a programmable network switch 104. Network 140 may be a physical network or a virtual network (e.g., a software defined network). Switch 104 is coupled to distributed log 114 and data center 106. Although as depicted in FIG. 1, distributed log 114 and data center 106 are located within the same subnet and coupled to the same switch 104 within the same local area network, it is contemplated that distributed log 114 and data center 106 may be coupled across a plurality of switches and/or routers, or even located across a wide area network.

Switch 104 may be a physical switch. Switch 104 connects devices together on a network by using packet switching to receive, process, and forward data. Switch 104 is a programmable switch (e.g., a P4 switch programmable by the P4 programming language). A programmable switch can be programmed to change how the switch behaves.

Programmable switch 104 has been programmed to maintain an application switch counter 118. Application switch counter 118 is application-specific. That is, switch 104 contains a single application switch counter 118 for all copies of application 110 present on servers 108, and a different application switch counter (not shown) for each different application that may be present on servers 108. For example, if application 110 on servers 108 is a database and another application (not shown) on servers 108 is a cache, then switch 104 has an application switch counter 118 for database application 110, and a second, different application switch counter (not shown) for the cache application (not shown). In an embodiment, the initial value of application switch counter 118 is negative one, because application switch counter may be incremented before it is assigned to a packet, resulting in an initial packet_id of zero. In another embodiment, the initial value of application switch counter 118 is zero. The application switch counter 118 can be used to assign a packet_id to packets received at switch 104.

When one of clients 102 sends a packet to one of the copies of application 110 located on one of servers 108, switch 104 is programmed to analyze that packet. If the packet is for application 110, switch 104 optionally increments application switch counter 118, and then writes a packet_id to the packet equal to the value of application switch counter 118, as discussed further below in reference to FIGS. 4 and 5. Optionally, switch 104 is also programmed to determine whether a packet contains only read requests and no write requests, and forward packets that contain only read requests (no write requests) directly to data center 106, while sending (e.g., redirecting) packets that contain write requests to distributed log 114, as further discussed below in reference to FIGS. 4 and 5.

Switch 104 is programmed to send (e.g., redirect) some or all packets destined for application 110 (i.e., frame header 204 of the packet contains MAC destination address of server $108_1$ containing application $110_1$) to one of log units 116 of distributed log 114, where the packet is again sent back to its original destination, application 110. In certain embodiments, a copy of the packet is sent to one of log units 116. In certain embodiments, the original packet is sent (e.g., redirected) to one of log units 116. Distributed log 114 is a distributed version of a data structure conventionally known in computer science as a log. A log is a data structure that is append-only. Several concurrent writers do not interfere with one another when writing to a log, because a log is append-only. A log in a networking context would "record" or "log" each packet sent to the log, so as to create a history of an application to which the log pertains.

As used herein, to "record" or to "log" a packet on log unit 116 means to extract the packet_id from the packet (e.g., from an application header or MAC destination field of a frame header of the packet), make a copy of the packet, and store that copy within one of log units 116, such as by storing the packet to a map keyed by the packet_id of that packet. The map may be, for example, a write-once-address-space data structure, meaning that once information is written to that data structure, it cannot be modified. Information within the map may be shared among individual log units using a variety of replication techniques, such as chain replication (see Van Renesse, Robbert, and Fred B. Schneider. "Chain Replication for Supporting High Throughput and Availability," *OSDI*, vol. 4, pp. 91-104. 2004, hereby expressly incorporated by reference). Logging to a map ensures that each packet_id may only be written to once, and also leaves a "hole" to log lost packets upon their arrival. For example, if a packet with a packet_id that has already been logged is received at a log unit 116, the packet may not be logged again.

A distributed log is a distributed version of a log, meaning that portions of the log are stored in different log units $116_1$ to $116_N$ (collectively referred to as log units 116) in a structured, organized manner, as discussed below. Distributed log 114 is application-specific, meaning that a separate distributed log exists for a given application on servers 108. In FIG. 1, distributed log 114 is specific to application 110, which means that distributed log 114 only logs network packets destined for a copy of application 110 located on one of servers 108.

Each of log units 116 is a persistent storage device (e.g., one or more hard disks, flash memory modules, solid state disks, optical disks, virtual storage backed by physical storage, etc.). When a packet is received by one of log units 116, that log unit 116 stores a copy of the packet and forwards the packet on to its destination via switch 104. Log unit 116 also analyzes each packet for presence of misplaced requests, as further discussed below with reference to FIGS. 2A and 2B, and notifies application 110 of presence of "misplaced requests," as further discussed below with reference to FIG. 3, below.

The distributed aspect of distributed log 114 allows computing system 100 to scale in an efficient manner. As the number of clients 102 and/or servers 108 increases, the number of log units can be increased to accommodate traffic in network 140. This is a more efficient use of storage space than assigning a new storage unit to each of servers 108 as a new server 108 is added.

After switch 104 writes a packet_id to a packet, switch 104 determines which of log units 116 should store that packet. Switch 104 makes this determination according to a log organization technique that has been programmed into programmable switch 104. A log organization technique that switch 104 may enforce within distributed log 114 may be determined by a hash function, the solution of which assigns one of log units 116 to a packet being forwarded by switch 104, for logging. One simplified hash function that may be programmed into switch 104 is: all packets with a certain integer solution of a modulo operation on packet_id of the packet are logged on a given log unit 116. For example, the solution to a mod (packet_id, 100) operation may assign a packet to one of one-hundred log units 116. Another hash function that may be programmed into the switch is one based on the source IP address and source port, ensuring that all packets associated with a given client are assigned to the same log unit. Another hash function may be based on the source IP and destination IP addresses, ensuring that all packets associated with a given TCP connection are assigned to the same log unit. In some embodiments, it is advantageous that all packets from a given connection between one of clients 102 and a copy of application 110 are stored together on the same log unit 116. Such functionality may be programmed into switch 104.

Upon receiving a packet from switch 104, one of log units 116 logs the packet. Then, if the packet contains misplaced requests, log unit 116 first sends a notification to application 110 regarding the number of requests present in the packet, and then sends the packet. If packet does not contain misplaced requests, log unit 116 simply forwards the packet to application 110. Misplaced requests are further discussed below with reference to FIG. 3.

Computing system 100 includes data center 106. Data center 106 comprises a plurality of servers $108_1$ to $108_N$ (collectively referred to as servers 108). Each server 108 contains a copy of server-side application 110. The copies are continually synchronized by computing system 100 to be up-to-date, as per the present disclosure. For example, each copy of application 110 can be brought up-to-date by accessing a history of application payload 212 (see FIG. 2A) data containing writes to perform on application 110, and performing the writes on application 110. The application payload 212 data is contained within packets stored in distributed log 114. In an embodiment, data center 106 has a gateway (not shown) to which initial requests for a connection by one of clients 102 are sent to a copy of application 110, and the gateway (not shown) then connects one of clients 102 to a copy of application 110 on one of servers 108, the gateway taking into account considerations such as current load on each of servers 108.

Servers 108 implement shim layers $112_1$ to $112_N$ (collectively referred to as shim layers 112). Each of servers 108 implements one of shim layers 112. In an embodiment, each of shim layers 112 is a software service implemented on one of servers 108. A single shim layer of shim layers 112 wraps one copy of application 110 and is configured to intercept all packets that arrive at that copy of application 110. Each of shim layers 112 maintains an application shim counter 120. Application shim counter 120 is specific to the copy of the application 110 wrapped by its shim layer 112. That is, in FIG. 1, application shim counter $120_1$ has a value that reflects packets that have arrived at server $108_1$ for application $110_1$, and does not reflect packets that have arrived at server $108_2$ or $108_n$ for applications $110_2$ or $110_n$, respectively. In an embodiment, the initial value of each application switch counter 120 is negative one.

It should be noted that by implementing shim layer 112, application 110 does not need to be modified to take advantage of techniques of the present disclosure. This means that computing system 100 of the present disclosure supports legacy applications, and that new versions of existing applications do not need to be developed to take advantage of techniques of the present disclosure.

Upon intercepting a packet, shim layer 112 compares the packet_id (e.g., value of the packet_id) of the packet to its application shim counter 120 (e.g., the value of application shim counter 120) to make sure that its copy of application 110 is up-to-date. Shim layer 112 ensures that its copy of application 110 is up-to-date by making sure that the packet_id of the packet is equal to its application shim counter 120 plus one (the next expected packet). If the optimization discussed with reference to FIG. 4, below, is implemented, then the packet_id may also be exactly equal to application shim counter 120 for the copy of application 110 to be considered up-to-date.

If the copy of application 110 wrapped by shim layer 112 is up to date, shim layer 112 sets its application shim counter 120 equal to the packet_id of the packet. Setting application shim counter 120 equal to the packet_id in effect increments application shim counter 120 every time a logged packet for application 110 arrives at server 108, as described in more detail with reference to FIG. 3 below. Then, shim layer 112 forwards the packet to the protocol stack of the copy of application 110 wrapped by shim layer 112. The protocol stack may be a TCP stack or a UDP stack.

For example, shim layer $112_1$ may consider application $110_1$ up-to-date if the packet_id is equal to application shim counter $120_1$ or equal to application shim counter $120_1$ plus one. The packet_id may equal application shim counter $120_1$ if the packet were unlogged in distributed log 114, which may happen if the packet contained only a read request. This is because, in an embodiment, application switch counter 118 is only incremented if a packet contains a write request, and so, several packets with the same packet_id may arrive at shim layer $112_1$ if the packets only contain read requests. On the other hand, the packet_id would equal application shim counter $120_1$ plus one (or next increment of application shim counter $120_1$, if not incremented by one) when a logged packet (containing a write request) arrives at shim layer $112_1$ from log unit $116_1$. Setting application shim counter $120_1$ equal to the packet_id in effect increments application shim counter $120_1$ every time a logged packet for application $110_1$ arrives at server $108_1$. Therefore, the comparison of application shim counter $120_1$ to the packet_id of the packet may indicate if there are additional packets (e.g., with a lower packet_id) that have not been received yet by shim layer $112_1$ and application $110_1$, indicating application $110_1$ is not up-to-date.

If the copy of application 110 wrapped by shim layer 112 is not up to date, shim layer 112 contacts one or more of log units 116 to request missing packets. Missing packets would be packets with packet_id's in between the value of application shim counter 120 and packet_id of the packet that prompted the missing packet request from log units 116. When the copy of application 110 is up-to-date, application shim counter 120 is set equal to packet_id of the packet that prompted the missing packet request from log unit(s) 116, as this is the packet with the largest packet_id.

Before forwarding a packet to one of log units 116, switch 104 is programmed to write a packet_id to that packet. Various locations within a packet may be appropriate for switch 104 to write a packet_id, and the precise location may depend on arrangement of network connections between clients 102 and application 110. One possible implementation of writing packet_id to a packet is described in reference to FIG. 2A and FIG. 2B.

Figure 2A:
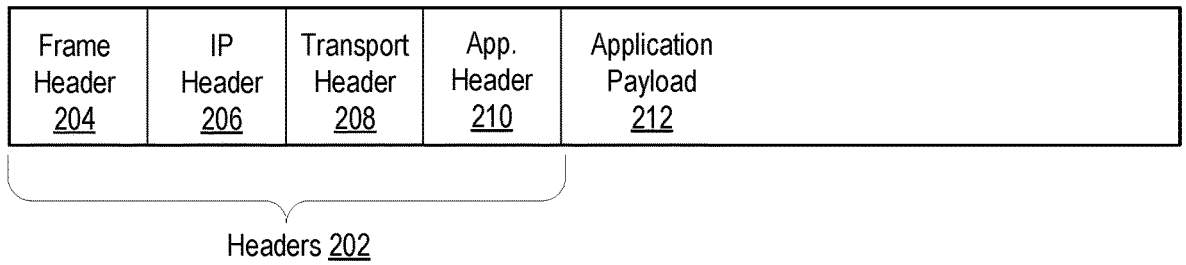
FIG. 2A depicts a block diagram of standard networking packet.

FIG. 2A depicts a block diagram of standard networking packet. In the context of computing system 100 of FIG. 1, application payload 212 contains data sent by one of clients 102 to a copy of application 110, that data being a read or write request. As used herein, a "request" is an action encoded by data within application payload 212 (see FIG. 2B), that action being a request to read data from application 110 or to write data to application 110. Application header 210 contains metadata regarding application payload 212. The metadata may include authentication credentials of the connection, content type of the request, control options for the connection, etc. The application layer (application header 210 and application payload) are encapsulated in a transport layer by inclusion of a transport header 208 before application header 210. Transport header 208 includes metadata for the transport layer, which can be implemented using protocols like TCP or UDP. Transport header 208 metadata may include a checksum of the application layer date (application header 210 and application payload 212), source port address, destination port address, etc. Transport layer (208, 210, 212) is encapsulated by IP header 206, such that the IP header provides metadata for the network layer (206, 208, 210, 212). IP header 206 metadata may include source IP address, destination IP address, etc. The network layer (206, 208, 210, 212) is further encapsulated by a frame header, which includes metadata such as MAC destination address, MAC source address, Ethernet type, etc.

Switch 104 is able to read and write to headers 202, which is a section at the start of a packet, containing packet layer headers, but the switch is not able to read application payload 212 or past a first occurrence of an application payload 212 within a packet. Headers 202 usually comprises frame header 204, IP header 206, transport header 208, and application header 210. One implementation of switch 104 writing a packet_id to a packet is to write packet_id to application header 210, such as to the first 8 bytes of application header 210. However, in some circumstances, as discussed in reference to FIG. 2B below, application header 210 is not present at the start of a packet within headers 202, and/or is unavailable for modification by switch 104.

Figure 2B:
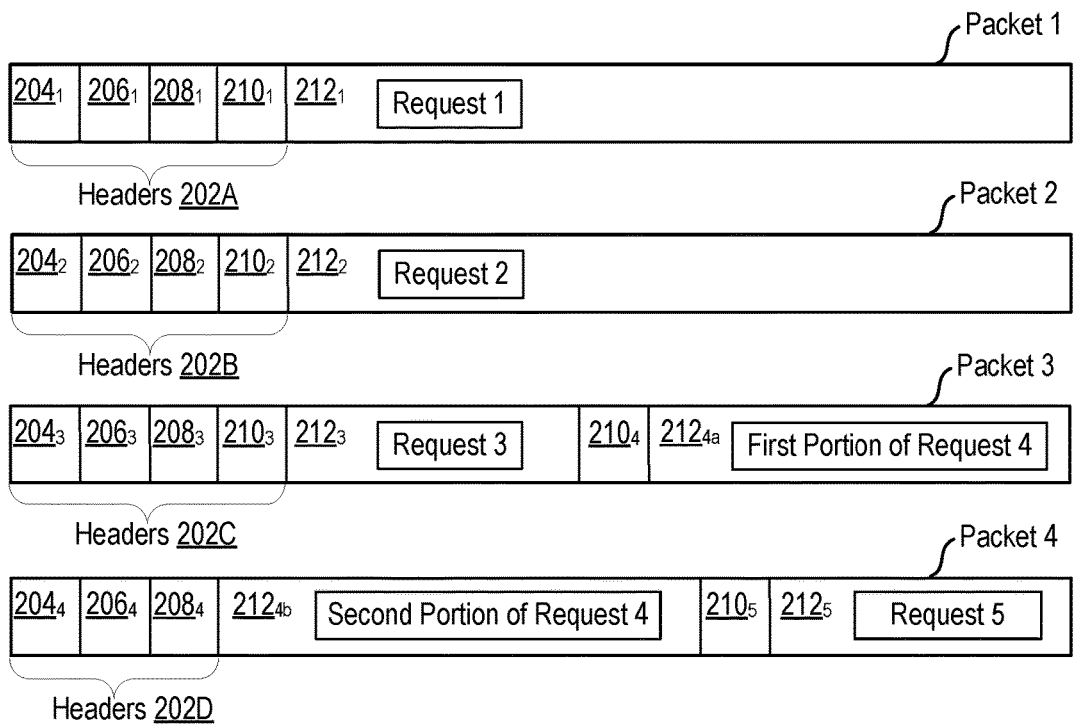
FIG. 2B depicts a potential sequence of packets received by switch, as well as various structures that packets may have.

FIG. 2B shows a potential sequence of packets received by switch 104, as well as various structures that packets may have. Certain transport protocols, such as UDP, are message oriented. Message oriented transport protocols contain one request per packet. As depicted in FIG. 2B, packet 1 and packet 2 each comprise a single, whole request. Packets 1 and 2 are exemplary of packets sent through a message oriented protocol, such as UDP. However, packets 3 and 4 cannot be sent through a message oriented protocol, and can only be sent through a stream oriented protocol, such as TCP.

Certain transport protocols, such as TCP, are stream oriented. Stream oriented protocols may contain more than one request per packet, and a request may be split between two or more packets. A stream oriented protocol is able to transfer all four packets 1, 2, 3, and 4. In a stream oriented protocol, a request may be split between two packets, such as how request 4 is split between packet 3 and packet 4 in FIG. 2B. In such a situation, application header 210$_4$ of request 4 is not present within headers 202D, and thus, no application header 210$_4$ is available for switch 104 to write a packet_id. In this situation, packet 4 may be labeled with a packet_id by switch 104 in a different portion of headers 202D.

For example, switch 104 may write the packet_id to a MAC destination address of frame header 204$_4$. As shown in FIG. 1, it is possible to write to the MAC destination address of packet 4 because distributed log 114 and data center 106 are located within the same local area network, specifically within a subnet of switch 104. However, distributed log 114 and data center 106 may be connected by a wide area network, in which case, an alternative section of headers 202D may be modified to write packet_id to packet 4, as determined to be appropriate by one skilled in the art. For example, a packet_id may be written to transport header 208 if a field in transport header 208 is determined to be modifiable without jeopardizing functionality of computing system 100. When writing packet_id to a packet, switch 104 may also need to update the checksum of the packet, which may be stored in application header 210, transport header 208, or elsewhere within headers 202.

Figure 3:
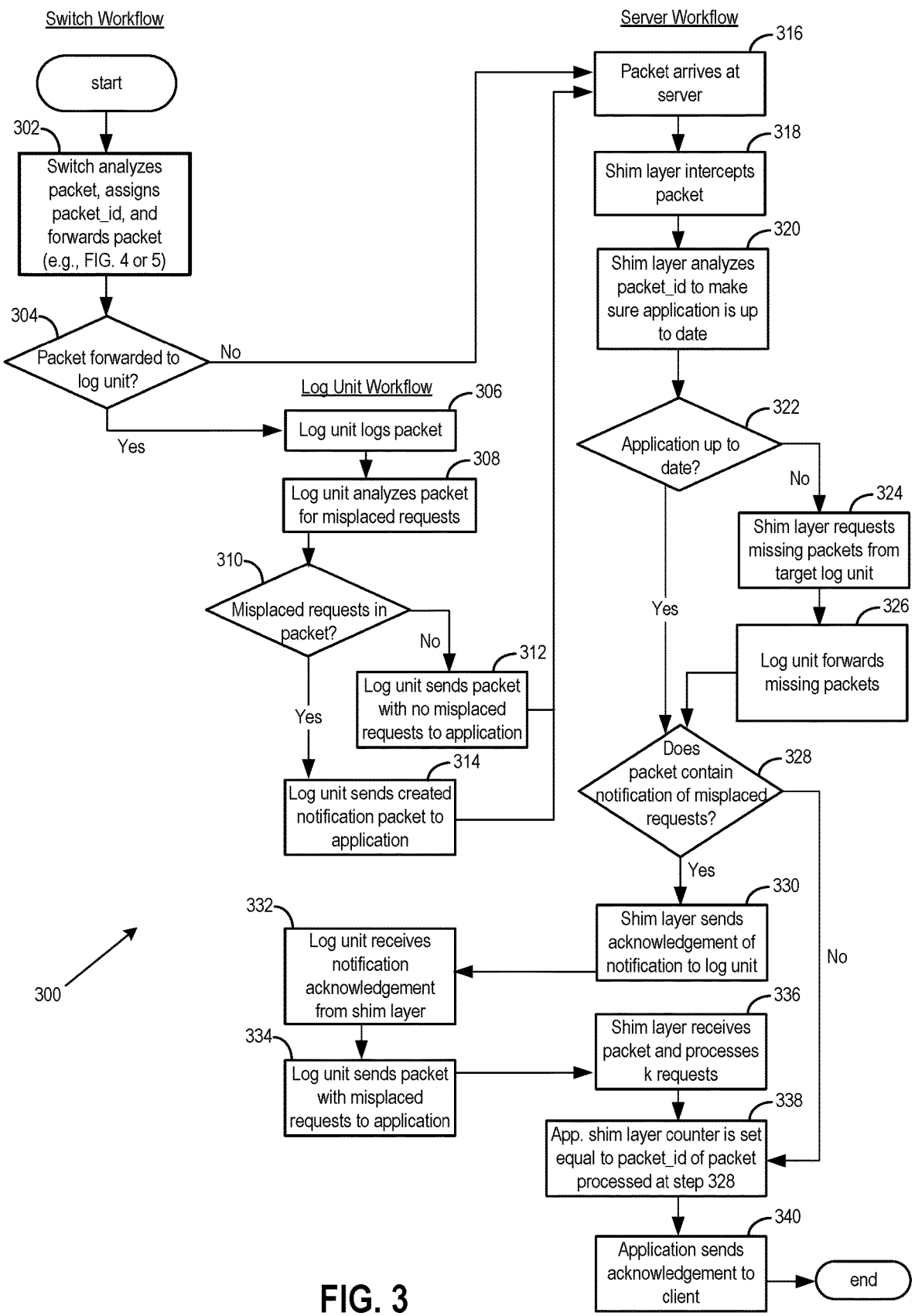
FIG. 3 depicts a flow diagram of a method of transferring packets to an application such that synchronization and replication of the application is ensured, according to an embodiment.

FIG. 3 depicts a flow diagram of a method 300 of transferring packets to an application 110 such that synchronization and replication of application 110 is ensured. For discussion of FIGS. 3-5, a specific client 102$_1$, log unit 116$_1$, server 108$_1$, shim layer 112$_1$, application shim counter 120$_1$, and copy of application 110$_1$ will be used from FIG. 1, as designated by subscript "1" at the end of the term's numeral. The subscript "1" is added for clarity of disclosure.

Before method 300 begins, client 102$_1$ establishes a connection to copy of application 110, that copy being application 110$_1$ located on server 108$_1$. Optionally, the connection is established through a gateway (not shown) on data center 106 that chooses the optimal server 108$_1$ of servers 108, taking into considerations such as current load on each of servers 108. In another embodiment, two separate connections are created between client 102$_1$ and server 108$_1$: one connection for write requests, and another connection for read requests. Method 300 is triggered when client 102$_1$ sends a packet to application 110$_1$.

At step 302, switch 104 receives the packet, analyzes the packet, assigns a packet_id to the packet, and forwards the packet either to log unit 116$_1$ or to server 108$_1$. Step 302 is described in detail with reference to FIG. 4 in the subsequent paragraphs. An alternative embodiment to that shown in FIG. 4 is depicted in FIG. 5.

Figure 4:
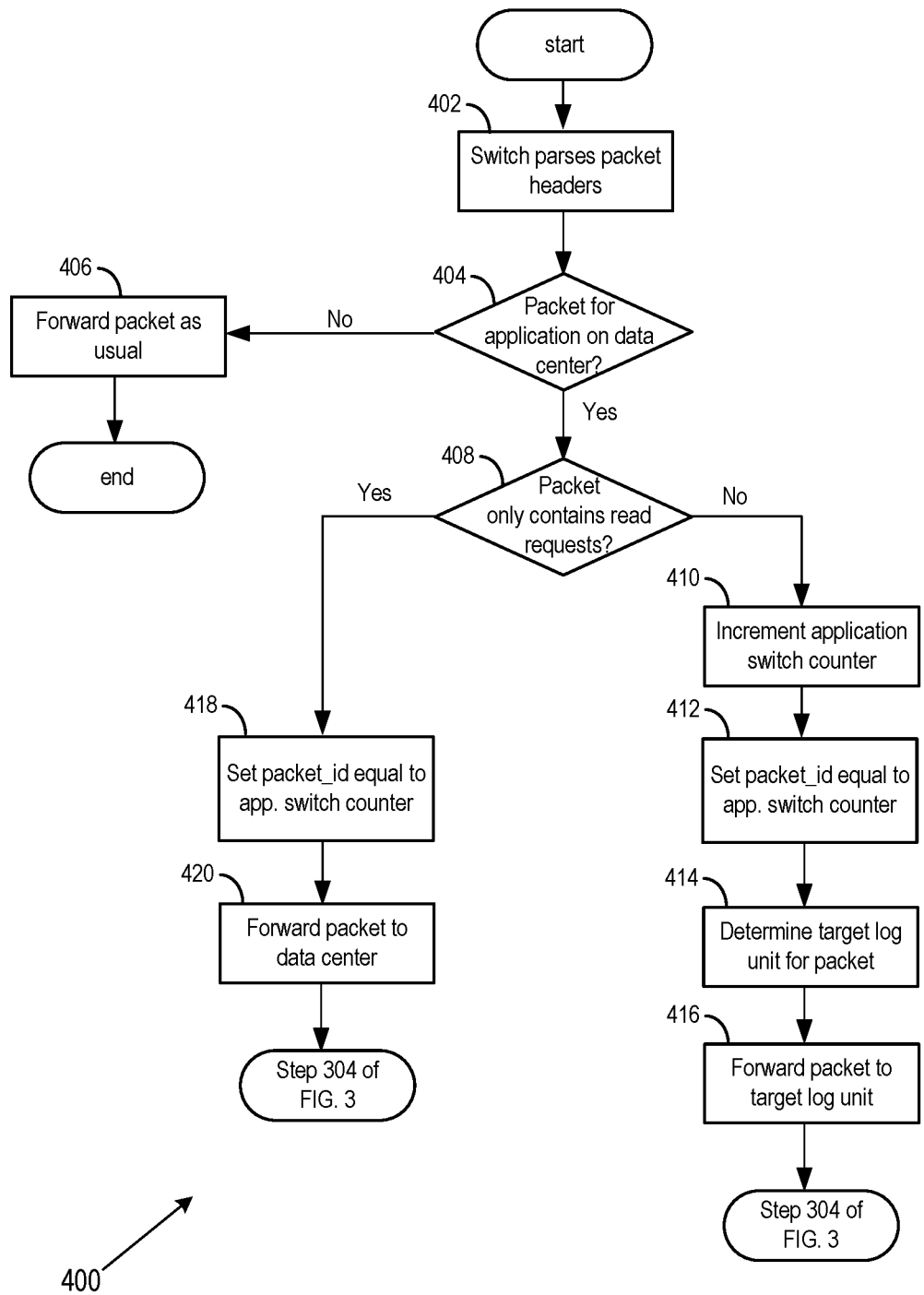
FIG. 4 depicts a flow diagram of a method of processing a packet by a programmable switch, which logs write requests and does not log read requests, according to an embodiment.
Figure 5:
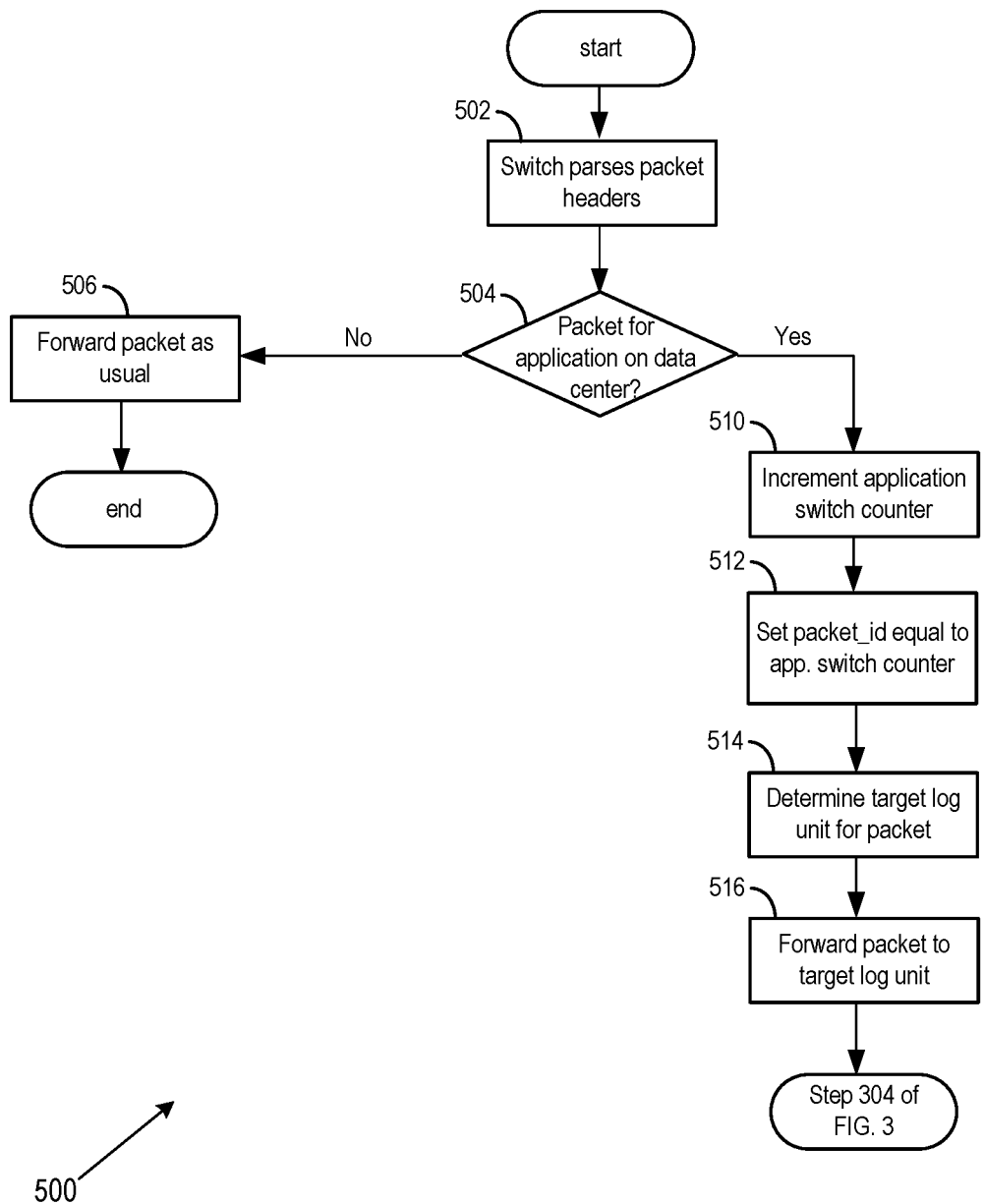
FIG. 5 depicts a flow diagram of a method that is an alternative to the method depicted in FIG. 4, where the switch logs all requests, according to an embodiment.

FIG. 4 depicts a flow diagram of a method 400 of processing a packet by switch 104, in which switch 104 logs write request and does not log read requests. Method 400 expands step 302 of FIG. 3. In method 400, switch 104 differentiates between packets that contain only read requests and packets that contain write requests. The difference is noteworthy because read requests do not change the state of application 110$_1$. Therefore, these requests do not need to be recorded in distributed log 114. A record of read requests is not needed for restoring application 110$_1$ if that copy of the application is compromised by a power failure or a malicious user, because a read request does not change the state of application 110$_1$. Similarly, a read request to application 110$_1$ does not need to be synchronized to other copies of application 110, those copies being applications 110$_2$-110$_n$. This is because a read request does not change the state of application 110$_1$. Method 400 below is discussed in reference to FIG. 4 and also in reference to FIGS. 2A and 2B. Method 400 is triggered when switch 104 receives a packet.

At step 402, switch 104 parses packet headers 202 to determine whether the packet is destined for application 110$_1$ on data center 106, and whether the packet contains only read requests or write requests. Determining whether a packet contains only read requests or write requests is application specific. A person of ordinary skill in the art would analyze packets of application 110 to ascertain differences between read-only packets and write packets and add functionality to switch 104 to recognize these differences. For example, a person of ordinary skill in the art may notice that packets of application 110 containing a write request are tagged with a write-tag within application header 210. Functionality to recognize the write-tag would then be programmed into programmable switch 104.

As discussed previously, switch 104 is only able to parse headers 202 of a packet, and is unable to parse through or past the first occurrence of application payload 212 of a packet. This means that if, for example, packet 3 of FIG. 2B arrives at switch 104, and request 3 is a read request while request 4 is a write request, switch 104 would interpret the entire packet as containing only read requests. Thus, in order for method 400 to be implemented, client-side interface (not shown) located on client 102$_1$ of application 110$_1$ may need to be implemented in such a way that when client 102$_1$ sends a read request to application 110$_1$, the read request is the only request within its packet. A protocol such as TCP can be configured to send all read requests within their own packets (one-to-one correspondence between packet and read request), and such configuration is known to persons skilled in the art. Protocols such as UDP are message oriented, send one request per packet, and do not need to be further configured to implement method 400.

At step 404, after switch 104 parses headers 202 at step 402, switch 104 determines whether the packet is destined for application 110$_1$. This can be determined by analyzing the MAC destination address of frame header 204. If the packet is not destined for application 110$_1$, then at step 406, the packet is forwarded by switch 104 as usual. If the packet is destined for application 110$_1$ (i.e., frame header 204 of the packet contains MAC destination address of server 108$_1$ containing application 110$_1$), then at step 408, switch 104 determines whether the request associated with application header 210 within headers 202 at the start of the packet is a read request or a write request. If the request at the start of the packet is a write request, method 400 continues to step 410. If the request at the start of the packet is a read request, method 400 continues to step 418.

If the request at the start of the packet at step 408 is a write request, method 400 continues to step 410. Because the packet contains a write request, the packet will be modifying the state of application 110$_1$. Thus, this packet needs to be logged in distributed log 114.

At step 410, switch 104 increments application switch counter 118. Application switch counter 118 is specific to application $110_1$-$110_n$. At step 412, switch 104 writes the value of application switch counter 118 to the packet as the packet_id. As discussed above, packet_id may be written to a variety of sections within headers 202 of a packet depending on structure of the packet and architecture of the network through which the packet has passed and will be passing. For example, packet_id may be written to application header 210, such as the first 8 bytes of the application header 210, or to frame header 204, such as to the MAC destination field of frame header 204. After step 412, method 400 continues to step 414.

At step 414, switch 104 determines the target log unit $116_1$, in this example log unit $116_1$, for logging the packet. As discussed above, switch 104 may determine what log unit is appropriate by performing a hash function on the assigned packet_id of the packet. Also, it is advantageous that all packets of the same connection are logged within the same log unit. Thus, in another embodiment, switch 104 calculates the target log unit $116_1$ for the first packet of the connection, stores the designator of the log unit (the designator being, for example, an integer value or code). Thereafter, switch 104 retrieves the pre-calculated log unit $116_1$ for every write packet passing through this same connection (e.g., based on the source IP address and the destination IP address of the packet), to be logged on distributed log 114. At step 416, switch 104 forwards the packet to target log unit $116_1$, as determined in previous step 414, and method 400 continues to step 304 of method 300 of FIG. 3.

Returning to step 408, if the request at the start of the packet at step 408 is a read request, method 400 continues to step 418. When process continues to step 418, the packet being processed by switch 104 does not need to be logged in distributed log 114, because the packet does not change the state of application $110_1$.

At step 418, switch 104 does not increment the value of application switch counter 118, contrary to step 410. Rather, switch 104 writes the value of application switch counter 118 to the packet as the packet_id. Thus, step 418 writes the same packet_id to a read packet as the previous packet, resulting in more than one packet with the same packet_id eventually reaching shim layer $112_1$ within server $108_1$. When shim layer $112_1$ checks whether application $110_1$ is up to date in step 320 of FIG. 3, shim layer $112_1$ checks whether packet_id is equal to the current value of its internal counter (application shim counter $120_1$) or to the next incremental value of application shim counter $120_1$. This takes into account both read and write packets arriving at server $108_1$ for application $110_1$.

The mechanics of step 418 are identical to the mechanics of step 412, described above. That is, packet_id is written to an appropriate section of headers 202 of the packet, depending on structure of the packet and architecture of the network through which the packet passed or will be passing. Packet_id may be written to application header 210 or to MAC destination address of frame header 204. At step 420, switch 104 forwards the packet to application $110_1$, and method 400 moves to step 304 of method 300 of FIG. 3.

FIG. 5 depicts a flow diagram of a method 500 that is an alternative to method 400 of FIG. 4, and expands step 302 of FIG. 3. FIG. 5 depicts method 500 of processing a packet by switch 104, logging all requests, not just write requests. Method 500 is essentially steps 402, 404, and 410 through 416 of method 400. In method 500, switch 104 does not differentiate between packets that contain only read requests and packets that contain write requests. Therefore, all requests are logged in distributed log 114. Method 500 is triggered when switch 104 receives a packet.

At step 502, switch 104 parses packet headers 202 to determine whether the packet is destined for application $110_1$ on data center 106. Switch 104 does not determine whether the packet contains only read requests or write requests. In order for method 500 to be implemented, client-side interface (not shown) of application $110_1$, located on client $102_1$, would not need to be implemented in such a way that read requests are in their own packets with one-to-one request-packet correspondence, as was required for steps 402 and 408 of method 400.

At step 504, after switch 104 parses headers 202 at step 502, switch 104 determines whether the packet is destined for application $110_1$. Step 504 of FIG. 5 is similar to step 404 of FIG. 4. Whether the packet is destined for application $110_1$ can be determined by analyzing the MAC destination address of frame header 204. If the packet is not destined for application $110_1$, then at step 506, the packet is forwarded by switch 104 as usual. If the packet is destined for application $110_1$, then method 500 continues to step 510. Steps 510 through 516 of method 500 are similar to steps 410 through 416 of method 400.

At step 510, switch 104 increments application switch counter 118. At step 512, switch 104 writes the value of application switch counter 118 to the packet as the packet_id, such as to application header 210 or frame header 204, as discussed in more detail with reference to step 412 above.

At step 514, switch 104 determines the target log unit $116_1$ for logging the packet, such as with a hash function, as discussed in detail with reference to step 414 above.

At step 516, switch 104 forwards the packet to target log unit $116_1$, as determined in previous step 514, and method 500 continues to step 304 of method 300 of FIG. 3.

Returning to step 304 of FIG. 3, if switch 104 forwarded packet to log unit $116_1$ in step 302, then method 300 continues to step 306. Otherwise, switch 104 forwarded packet to server $108_1$, and method 300 continues to step 316.

At step 306, log unit $116_1$ logs the packet. As described above, to "log" a packet on log unit $116_1$ means to extract the packet_id from the packet (e.g., from application header or frame header of packet), make a copy of the packet, and store that copy within log unit $116_1$, such as by storing the packet to a map keyed by the packet_id of that packet. Logging to a map ensures that each packet_id may only be written to once, and also leaves a "hole" to log lost packets upon their arrival.

At step 308, log unit 116 analyzes the packet for misplaced requests. Referring to FIGS. 2A and 2B, "misplaced requests" are requests whose application header 210 is present outside of headers 202 of a packet, after application payload 212 of a request. Misplaced requests occur in stream oriented protocols such as TCP. Misplaced requests are problematic because switch 104 is unable to notice them and so, is unable to assign packet ids to misplaced requests.

Exemplary packets 3 and 4 contain misplaced requests 4 and 5, respectively, because application headers $210_4$ and $210_5$ are outside of the headers 202 section of their packets. That is, application header $210_4$ is located after application payload $212_3$ of request 3, past headers 202C. And application header $210_5$ is located after application payload $212_{4b}$ of request 4, past headers 202D. Whenever application header 210 of a packet is located past headers 202, switch 104 is unable to parse this application header 210, unable to parse the request following that application header 210, and is thus unable to label the request with an incremental packet_id in a way that can be processed by shim layer $112_1$ to ensure that application $110_1$ is up-to-date. However, log unit $116_1$ is able to parse an entire packet and notify shim layer $112_1$ of misplaced requests within a packet, allowing shim layer $112_1$ to process misplaced requests upon receipt.

At step 310, if log unit $116_1$ detects presence of misplaced requests within the packet, method 300 continues to step 314. At step 314, log unit $116_1$ creates a notification packet to notify application $110_1$ of the presence of misplaced requests within the next packet that log unit $116_1$ will send to application $110_1$. The notification packet is tagged with the same packet_id as the packet to which the notification pertains (that is, the packet containing misplaced requests, which is the packet sent by client $102_1$ and received by switch 104 in step 302). Tagging the notification packet with the same packet_id as the packet containing misplaced requests allows shim layer $112_1$ to later check whether application $110_1$ is up-to-date upon receiving the notification packet, by comparing packet_id of the notification packet to the value of application shim counter $120_1$ at step 320.

The notification packet will also contain the number of misplaced requests that will be contained in the packet containing misplaced requests. The number of misplaced requests is herein referred to as "k" for brevity. For example, in FIG. 2B, the value of k for packet 1 is 0. For packet 2, k is equal to 0. For packet 3, k is equal to 1. For packet 4, k is equal to 1. Log unit $116_1$ may write the value of k within the notification packet where appropriate, as determined by a person of ordinary skill in the art. For example, value of k may be written to application payload 212, or to an appropriate field within headers 202. The packet containing missing requests will be sent at step 334 of method 300. After step 314, method 300 continues to step 316.

At step 310, if log unit does not detect presence of misplaced requests within the packet, method 300 continues to step 312, where log unit sends the packet to application $110_1$. From step 312, method 300 continues to step 316.

Returning to step 304, if switch 104 forwarded packet to server $108_1$ in step 302, then method 300 continues from step 304 to step 316. The transition from step 304 to 316 results in the same sequence of steps as the transitions from step 312 to 316, and from step 314 to 316. The sequence of steps starting at step 316 is discussed next.

Method 300 continues to step 316 from step 304, 312, or 314. Step 316 occurs when the packet destined for application $110_1$ arrives at server $108_1$. At step 318, upon arrival at server $108_1$, shim layer $112_1$ intercepts the packet before it reaches application $110_1$.

At step 320, shim layer $112_1$ analyzes packet_id of the packet to make sure that application $110_1$ is up-to-date with the history of distributed application 110, that history having been recorded in distributed log 114. Application $110_1$ is an individual copy of the distributed application 110, distributed throughout servers 108 of data center 106. Application $110_1$ may not be up to date if another client, for example client $102_2$, wrote to another copy of application 110, that copy being for example application $110_2$, during the course of the session between client $102_1$ and application $110_1$.

Shim layer $112_1$ makes sure application $110_1$ is up to-to-date by comparing packet_id of the packet to the value of application shim counter $120_1$. In an embodiment, shim layer $112_1$ may consider application $110_1$ up-to-date if packet_id is equal to application shim counter $120_1$ or equal to application shim counter $120_1$ plus one. Packet_id would equal application shim counter $120_1$ if the packet were unlogged in distributed log 114, which would happen if the packet contained only a read request and method 400 were implemented for step 302. Packet_id would equal application shim counter $120_1$ plus one (or next increment of application shim counter $120_1$, if not incremented by one) when a logged packet arrived at shim layer $112_1$ from log unit $116_1$. Setting application shim counter $120_1$ equal to packet_id in effect increments application shim counter $120_1$ every time a logged packet for application $110_1$ arrives at server $108_1$.

If shim layer $112_1$ determines that application $110_1$ is not up to date, method 300 continues to step 324, and then 326, before reaching step 328. At step 322, if shim layer $112_1$ determines that application $110_1$ is up-to-date, method 300 skips steps 324 and 326, and continues to step 328.

If at step 322, shim layer $112_1$ determines that application $110_1$ is not up to date, then at step 324, shim layer $112_1$ requests the missing packets from distributed log 114. Missing packets are packets whose packet_id's fall between the value of application shim counter $120_1$ and the value of packet_id of the packet that was originally received by switch 104 at step 302 and has now reached server $108_1$. Shim layer $112_1$ requests the missing packets from the specific log unit or units 116 that contains the missing packets. Shim layer $112_1$ is able to determine which of log units 116 should be contacted in the same manner that switch 104 is able to determine which of log units 116 should lot a packet with a given packet_id. That is, shim layer $112_1$ may apply the same hash function to missing packet_id that switch 104 applied. Alternatively, shim layer $112_1$ may send a missing packet request through switch 104, and switch 104 may determine the appropriate target log unit itself, before forwarding the request to that log unit. Switch 114 may determine the target log unit(s) 116 by parsing information added to headers 202 by shim layer $112_1$ for the use of switch 104. In an embodiment, shim layer $112_1$ sends a single packet to request all missing packets. In another embodiment, shim layer $112_1$ sends one request packet for each missing packet.

At step 326, log unit(s) 116 that contain missing packets send the missing packets to shim layer $112_1$. Each of these missing packets then continue to step 328 for further processing, as discussed below.

At step 328, shim layer $112_1$ parses the packet to determine whether the packet is a notification of misplaced requests. If the packet arrived at step 328 from steps 304, 312, or 326, then the packet does not contain a notification of misplaced requests. In this case, method 300 continues to step 338. At step 338, application shim layer counter $120_1$ is set equal to packet_id of the packet, and this packet has the highest packet_id of any packet received for application $110_1$ by shim layer $112_1$ at that point in time. Method 300 then continues to step 340.

Returning to step 328, if the packet arrived at step 328 from step 314, then the packet contains a notification of misplaced requests. In this case, method 300 continues to step 330. At step 330, shim layer $112_1$ parses the notification packet, stores the value of k, and sends an acknowledgement back to log unit $116_1$.

At step 332, log unit $116_1$ receives acknowledgement from shim layer $112_1$. After receiving the acknowledgement of notification packet from shim layer $112_1$, at step 334, log unit $116_1$ sends the packet containing misplaced requests to shim layer $112_1$. The packet containing misplaced requests is the same packet that triggered method 300 and that was received by switch 104 at step 302.

At step 336, shim layer $112_1$ receives packet containing misplaced requests and services k requests. Shim layer $112_1$ provides application $110_1$ with packets, such as the misplaced packets, one at a time, in the order that packets were received by switch 104. After shim layer $112_1$ places packets that it receives onto the protocol stack (such as TCP stack)

of application $110_1$, the protocol checks transport header 208 of packets in its stack and notices if certain packets in the stack are out of order. "Out of order" here means that the packets are not in the same order as the order sent by client $102_1$. The protocol then reorders the packets if needed, ensuring that application $110_1$ receives and executes packets in the same order as they were sent by client $102_1$.

At step 338, application shim layer counter $120_1$ is set equal to packet_id of the last processed packet, which is the packet from step 328 of method 300.

Finally, at step 340, method 300 ends when application $110_1$ sends an acknowledgement of packet receipt to client $112_1$ that originally sent the packet. Optionally, if the packet is a missing packet retrieved from distributed log 114 in steps 324 and 326 of method 300, then no acknowledgement needs to be sent to client $112_1$, because presumably another copy of application 110 had already sent an acknowledgement.

It should be noted that the above described process is able to cope with protocol retransmissions, for example, TCP retransmissions. Packet loss may occur during packet transfer from source to destination. Such packet loss is detected by some protocols, such as TCP, and results in retransmission of the lost packet. There are two relevant situations after which packet retransmission may occur: (1) a packet may be lost after it leaves switch 104, and thus, the packet would have been assigned a packet_id before it was lost, and (2) a packet may be lost before it reaches switch 104, and thus, the packet would not have been assigned a packet_id before it was lost.

Regarding situation (1), two sub-situations are possible: (a) the lost packet with an assigned packet_id was lost before it reached distributed log 114, and thus was never logged, and (b) the lost packet with an assigned packet_id was lost after leaving distributed log 114, and thus was logged before being lost. Regarding situation (1) (a), if the lost packet is not stored in distributed log 114, a hole exists in the sequence of stored packets within the map used to log packets. Regarding situation (1) (b), if the lost packet was previously stored in distributed log 114, the log unit 116 containing the logged, retransmitted packet simply ignores the retransmitted packet to avoid storing the retransmitted packet again.

Regarding situation (2), if a packet never reaches switch 104 before it is lost, the retransmitted packet is treated as a new packet by switch 104, with switch 104 assigning the next packet_id value when the retransmitted packet arrives at switch 104. Although this may appear as though packet reordering may occur, original packet sequence is ensured by application $110_1$ protocol stack, such as a TCP stack. After shim layer $112_1$ places packets that it receives onto the protocol stack of application $110_1$, the protocol notices if certain packets in the stack are out of order, and reorders them accordingly, ensuring that application $110_1$ receives and executes packets in the same order as they were sent by client $102_1$.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of transferring a packet from a source client to a destination application across a network, comprising:
   receiving, by a switch, the packet from the source client;
   determining, by the switch, the packet is for the destination application, wherein a plurality of copies of the destination application are distributed among a plurality of servers in a data center;
   maintaining, by the switch, a first counter associated with the plurality of copies of the destination application, wherein the switch is configured to increment the first counter based on packets received with a destination of any of the plurality of copies of the destination application, wherein the switch maintains separate counters for different applications;
   based on determining the packet is for the destination application, writing an identifier to the packet by the switch, wherein the identifier written to the packet by the switch is a value of the first counter;
   transferring the packet by the switch to a distributed log, wherein the distributed log comprises a distributed log data structure, and wherein the distributed log data structure is distributed among a plurality of storage devices such that each storage device of the plurality of storage devices stores a portion of the distributed log data structure;
   logging a copy of the packet at the distributed log data structure;
   transmitting the packet from the distributed log to a copy of the destination application running on a destination server of the plurality of servers;
   intercepting the packet by a shim layer running on the destination server;
   comparing, by the shim layer, the identifier to a second counter maintained by the shim layer, wherein the second counter is specific to the copy of the destination application running on the destination server;
   requesting, by the shim layer, missing packets from the distributed log data structure of the distributed log based on the comparison; and
   forwarding the packet to the copy of the destination application running on the destination server.

2. The method of claim 1, further comprising responsive to comparing the identifier to the second counter:
   determining, by the shim layer, whether the copy of the destination application running on the destination server is up-to-date, and if not up-to-date, performing the requesting, by the shim layer, of the missing packets from the distributed log data structure of the distributed log.

3. The method of claim 1, further comprising analyzing, by the distributed log, the packet for misplaced requests and responsive to the analyzing: determining that the packet comprises a first request and a misplaced request, wherein the first request and the misplaced request are separated within the packet by an application header; creating a notification of misplaced requests; transmitting, by the distributed log, the notification of misplaced requests to the shim layer; receiving, by the distributed log, an acknowledgement of the notification of misplaced requests from the shim layer; and responsive to receiving the acknowledgement of the notification of misplaced requests, transmitting the packet by the distributed log to the shim layer.

4. The method of claim 3, wherein the notification of misplaced requests comprises the identifier of the packet and a value equal to a number of misplaced requests within the packet.

5. The method of claim 1, wherein the transferring, logging, and transmitting occur if the packet contains requests to write to the destination application and does not occur if the packet only contains requests to read the destination application.

6. The method of claim 1, wherein the switch is a programmable switch that can be programmed to change how the switch behaves.

7. The method of claim 1, wherein the switch is configured to receive packets for the destination application from a plurality of source clients.

8. A non-transitory computer-readable storage medium comprising instructions, which when executed by a computing system, causes the computing system to carry out operations for transferring a packet from a source client to a destination application across a network, the operations comprising:
   receiving, by a switch, the packet from the source client;
   determining, by the switch, the packet is for the destination application, wherein a plurality of copies of the destination application are distributed among a plurality of servers in a data center;

maintaining, by the switch, a first counter associated with the plurality of copies of the destination application, wherein the switch is configured to increment the first counter based on packets received with a destination of any of the plurality of copies of the destination application, wherein the switch maintains separate counters for different applications;

based on determining the packet is for the destination application, writing an identifier to the packet by the switch, wherein the identifier written to the packet by the switch is a value of the first counter;

transferring the packet by the switch to a distributed log, wherein the distributed log comprises a distributed log data structure, and wherein the distributed log data structure is distributed among a plurality of storage devices such that each storage device of the plurality of storage devices stores a portion of the distributed log data structure;

logging a copy of the packet at the distributed log data structure;

transmitting the packet from the distributed log to a copy of the destination application running on a destination server of the plurality of servers;

intercepting the packet by a shim layer running on the destination server;

comparing, by the shim layer, the identifier to a second counter maintained by the shim layer, wherein the second counter is specific to the copy of the destination application running on the destination server;

requesting, by the shim layer, missing packets from the distributed log data structure of the distributed log based on the comparison; and forwarding the packet to the copy of the destination application running on the destination server.

9. The non-transitory computer-readable storage medium of claim 8, wherein the operations further comprise responsive to comparing the identifier to the second counter:

determining, by the shim layer, whether the copy of the destination application running on the destination server is up-to-date, and if not up-to-date, performing the requesting, by the shim layer, of the missing packets from the distributed log data structure of the distributed log.

10. The non-transitory computer-readable storage medium of claim 8, wherein the operations further comprise analyzing, by the distributed log, the packet for misplaced requests and responsive to the analyzing: determining that the packet comprises a first request and a misplaced request, wherein the first request and the misplaced request are separated within the packet by an application header; creating a notification of misplaced requests; transmitting, by the distributed log, the notification of misplaced requests to the shim layer; receiving, by the distributed log, an acknowledgement of the notification of misplaced requests from the shim layer; and responsive to receiving the acknowledgement of the notification of misplaced requests, transmitting the packet by the distributed log to the shim layer.

11. The non-transitory computer-readable storage medium of claim 10, wherein the notification of misplaced requests comprises the identifier of the packet and a value equal to a number of misplaced requests within the packet.

12. The non-transitory computer-readable storage medium of claim 8, wherein the transferring, logging, and transmitting occur if the packet contains requests to write to the destination application and does not occur if the packet only contains requests to read the destination application.

13. A computing system, comprising:
a source client;
a destination application;
a network;
a switch;
a distributed log; and
a shim layer;
wherein the computing system is configured to:
receive, by the switch, the packet from the source client;
determine, by the switch, the packet is for the destination application, wherein a plurality of copies of the destination application are distributed among a plurality of servers in a data center;
maintain, by the switch, a first counter associated with the plurality of copies of the destination application, wherein the switch is configured to increment the first counter based on packets received with a destination of any of the plurality of copies of the destination application, wherein the switch maintains separate counters for different applications;
based on determining the packet is for the destination application, write an identifier to the packet by the switch, wherein the identifier written to the packet by the switch is a value of the first counter;
transfer the packet by the switch to the distributed log, wherein the distributed log comprises a distributed log data structure, and wherein the distributed log data structure is distributed among a plurality of storage devices such that each storage device of the plurality of storage devices stores a portion of the distributed log data structure;
log a copy of the packet at the distributed log data structure;
transmit the packet from the distributed log to a copy of the destination application running on a destination server of the plurality of servers;
intercept the packet by the shim layer running on the destination server;
compare, by the shim layer, the identifier to a second counter maintained by the shim layer, wherein the second counter is specific to the copy of the destination application running on the destination server;
request, by the shim layer, missing packets from the distributed log data structure of the distributed log based on the comparison; and
forward the packet to the copy of the destination application running on the destination server.

14. The computing system of claim 13, wherein the computing system is further configured to, responsive to comparing the identifier to the second counter:

determine, by the shim layer, whether the copy of the destination application running on the destination server is up-to-date, and if not up-to-date, perform the requesting, by the shim layer, of the missing packets from the distributed log data structure of the distributed log.

15. The computing system of claim 13, wherein the computing system is further configured to analyze, by the distributed log, the packet for misplaced requests and responsive to the analyzing: determine that the packet comprises a first request and a misplaced request, wherein the first request and the misplaced request are separated within the packet by an application header; create a notification of misplaced requests; transmit, by the distributed log, the notification of misplaced requests to the shim layer; receive, by the distributed log, an acknowledgement of the notification of misplaced requests from the shim layer; and responsive to receiving the acknowledgement of the notification of misplaced requests, transmit the packet by the distributed log to the shim layer.

16. The computing system of claim 15, wherein the notification of misplaced requests comprises the identifier of the packet and a value equal to a number of misplaced requests within the packet.

17. The computing system of claim 13, wherein the transferring, logging, and transmitting occur if the packet contains requests to write to the destination application and does not occur if the packet only contains requests to read the destination application.

* * * * *